United States Patent
Petrovic

(10) Patent No.: US 12,462,677 B2
(45) Date of Patent: Nov. 4, 2025

(54) AUTONOMOUSLY GUIDING VEHICLES USING VEHICLES-CENTERED OCCUPANCY GRID INCLUDING COLLECTED INFORMATION ABOUT ROAD USERS

(71) Applicant: MERCEDES-BENZ GROUP AG, Stuttgart (DE)

(72) Inventor: Andreas Petrovic, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 272 days.

(21) Appl. No.: 18/034,165

(22) PCT Filed: Jul. 27, 2021

(86) PCT No.: PCT/EP2021/071064
§ 371 (c)(1),
(2) Date: Apr. 27, 2023

(87) PCT Pub. No.: WO2022/089800
PCT Pub. Date: May 5, 2022

(65) Prior Publication Data
US 2023/0394959 A1    Dec. 7, 2023

(30) Foreign Application Priority Data
Nov. 2, 2020   (DE) .................. 10 2020 006 719.0

(51) Int. Cl.
G08G 1/01       (2006.01)
B60W 60/00      (2020.01)
H04L 67/12      (2022.01)

(52) U.S. Cl.
CPC ....... G08G 1/0133 (2013.01); B60W 60/0025 (2020.02); B60W 2556/45 (2020.02); H04L 67/12 (2013.01)

(58) Field of Classification Search
CPC .................. G08G 1/0133; B60W 60/0025
See application file for complete search history.

(56) References Cited

U.S. PATENT DOCUMENTS 10,089,419 B2 *  10/2018  Michalke ............... G06F 30/20
2017/0176998 A1 *  6/2017  Fechner ............... G05D 1/0246
(Continued)

FOREIGN PATENT DOCUMENTS

DE    102006056835 A1    6/2008
DE    102010011629 A1    1/2011
(Continued)

OTHER PUBLICATIONS

International Search Report and Written Opinion mailed Oct. 18, 2021 in related/corresponding International Application No. PCT/EP2021/071064.

(Continued)

*Primary Examiner* — Jess Whittington
(74) *Attorney, Agent, or Firm* — PATENT PORTFOLIO BUILDERS PLLC

(57) ABSTRACT

A method for providing information detected by on-board sensors about road users in the surroundings of a vehicle involves providing the detected information as data structures representing vectors. Every vector is thereby associated with a cell of a predefined vehicle-mounted occupancy grid, in which a road user described by the respective information is situated. Every vector at least includes coordinates of an associated cell, in which the respective road user is situated, a speed vector, which represents a speed of the respective road user, a time stamp, which represents a point in time of a detection of the respective road user, and an object class, which represents a type of the respective road user.

15 Claims, 4 Drawing Sheets

(56) References Cited

U.S. PATENT DOCUMENTS

Figure 1:
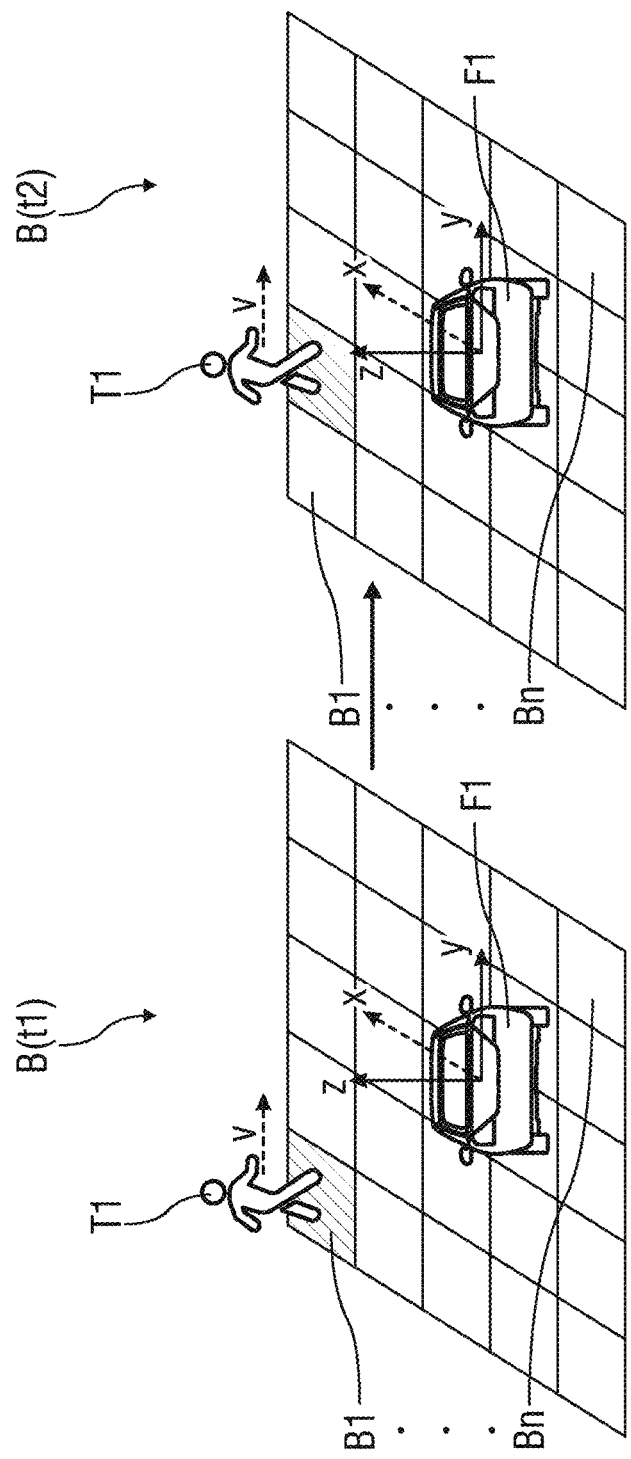

| | | |
|---|---|---|
| 2019/0047439 A1* | 2/2019 | Natroshvili ............ G06V 20/58 |
| 2019/0113918 A1* | 4/2019 | Englard ............... G05D 1/0088 |
| 2019/0236955 A1 | 8/2019 | Hu |
| 2019/0294889 A1 | 9/2019 | Sriram et al. |
| 2020/0249356 A1* | 8/2020 | Huang ................. G05D 1/0231 |
| 2020/0302783 A1 | 9/2020 | Altendorfer et al. |
| 2020/0309538 A1 | 10/2020 | Gonsa et al. |
| 2021/0163021 A1* | 6/2021 | Frazzoli .............. B60W 50/023 |
| 2021/0278851 A1* | 9/2021 | Van der Merwe ... G06V 10/764 |
| 2021/0354729 A1* | 11/2021 | Ng .................... B60W 30/0956 |
| 2022/0083077 A1* | 3/2022 | Pereira Da Silva .. G06F 18/253 |
| 2022/0383749 A1* | 12/2022 | Ishikawa ................ G06V 20/70 |

FOREIGN PATENT DOCUMENTS

| | | |
|---|---|---|
| DE | 102013210263 A1 | 12/2014 |
| DE | 102013223803 A1 | 5/2015 |
| DE | 102017217297 A1 | 3/2019 |
| DE | 102018215753 A1 | 3/2020 |
| DE | 102019201930 A1 | 8/2020 |
| DE | 102019107411 A1 | 9/2020 |
| JP | 2019117432 A | 7/2019 |
| JP | 2020046411 A | 3/2020 |
| JP | 2020046762 A | 3/2020 |

OTHER PUBLICATIONS

Office Action created Jun. 29, 2021 in related/corresponding DE Application No. 10 2020 006 719.0.

ZOU; "Free Space Detection Based On Occupancy Gridmaps;" Master-Thesis; Apr. 2012; URL:https://www.ias.informatik.tu-darmstadt.de/uploads/Theses/Zhou_MScThesis_2012.pdf.

Office Action dated Jun. 26, 2024 in related/corresponding DE Application No. 21 749 634.8.

Office Action dated Sep. 19, 2024 in related/corresponding KR Application No. 10-2023-7011370.

Office Action dated Apr. 2, 2024 in related/corresponding JP Application No. 2023-526683.

Office Action dated Mar. 12, 2025 in related/corresponding DE Application No. 10 2020 006 719.0.

* cited by examiner

AUTONOMOUSLY GUIDING VEHICLES USING VEHICLES-CENTERED OCCUPANCY GRID INCLUDING COLLECTED INFORMATION ABOUT ROAD USERS

BACKGROUND AND SUMMARY OF THE INVENTION

Exemplary embodiments of the invention relate to a method for providing information detected by means of on-board sensors about road users in the surroundings of a vehicle, as well as to a method for operating an automated, in particular highly automated or autonomously operable vehicle.

A method for providing an occupancy map for a vehicle is known from DE 10 2013 210 263 A1, in which driving conditions of the vehicle are determined by means of a determination device from data about the surroundings of a vehicle that is identified by means of several sensor devices, and an embodiment of the occupancy map is adapted depending on the driving conditions. The occupancy map has several cells arranged in a grid-like manner, which, depending on the driving conditions of the vehicle, are adapted to the driving conditions.

Furthermore, a method for representing the surroundings of a vehicle is known from DE 10 2010 011 629 A1, in which data about the surroundings is detected and is stored in hierarchical data structures, and objects are identified in the surroundings. A relevance of the objects regarding an application is determined and a level of detail of the hierarchical data structures is increased in regions in which objects with high application-specific relevance are detected. The data about the surroundings is hereby recorded as sensor measurement data in occupancy grids, in order to maintain a probabilistic representation of the surroundings. Every cell of the occupancy grid contains an occupancy probability, which was calculated in this location on the basis of the sensor measurement data.

Exemplary embodiments of the invention are directed to an innovative method for providing information detected by means of on-board sensors about road users in the surroundings of a vehicle.

In the method for providing information detected by means of on-board sensors about road users in the surroundings of a vehicle, the detected information is provided according to the invention as data structures that each represent a vector that describes the respective road user. Every vector is thereby associated with a cell of a predefined vehicle-mounted occupancy grid, in which cell the road user to whom the respective information relates is situated. Every vector thereby comprises as data at least coordinates of the associated cell, in which the respective road user is situated, a speed vector, which represents a speed of the respective road user, a time stamp, which represents a point in time of a detection of the respective road user, and an object class, which represents a type of the respective road user. The information about the road user provided as vectors is preferably combined into a data field and transmitted to a back-end server.

The method enables a tracking of road users via an entire so-called "operational design domain" (ODD for short). When making the information available on the back-end server available to a vehicle fleet, a uniform picture of traffic conditions with a high level of detail regarding a temporal and spatial solution can be created for the whole fleet. The method thereby enables a safe path planning, an early avoidance of collisions and thus a smoother driving of an automatedly driving vehicle.

In a possible embodiment of the method, a position of the vehicle and/or an orientation of the vehicle and/or a definition of the occupancy grid information concerning the occupancy grid are transmitted to the back-end server. This enables the back-end server to carry out a reliable and exact conversion of the information received from the vehicle in a global coordinate system and thus to make it available to other vehicles.

To this end, in a further possible embodiment of the method, the back-end server carries out a coordinates transformation based on the additional information, by means of which the vectors received as a data field from a vehicle are transformed from the vehicle-mounted occupancy grid of this vehicle into a predetermined global, stationary occupancy grid.

In a further possible embodiment of the method, the vectors of other vehicles that were transformed into the global occupancy grid are provided for retrieval, so that the vehicles can use the information for their own driving operation.

In a further possible embodiment of the method, in a transmission occurring in a retrieval, the transformed vectors are transmitted as a data field from the back-end server to at least one further vehicle, wherein every vector is associated with a cell of the global occupancy grid in which a road user described by the respective information is situated. Every vector thereby at least comprises coordinates of the associated cell in which the respective road user is situated, a speed vector, which represents a speed of the respective road user, a time stamp, which represents a point in time of a detection of the respective road user, and an object class, which represents a type of the respective road user. This supports the tracking of road users via the complete "Operational Design Domain," also for other vehicles of a vehicle fleet for creating a uniform picture of traffic conditions with a high level of detail regarding a temporal and spatial solution. For the further vehicles, a safe path planning, an early avoidance of collisions and thus a smoother driving of the automatedly driving vehicles are thus achievable.

In a further possible embodiment of the method, the other vehicles are automatedly operated in a vehicle fleet configured for an automated, in particular highly automated or autonomous operation.

In the method according to the invention for operation of an automated, in particular highly automated or autonomously operable vehicle, the information retrieved by the back-end server is taken into consideration in the automated operation of the vehicle. In an automated, in particular highly automated or autonomous driving operation of a vehicle, knowledge of the surroundings of a vehicle is absolutely necessary. To this end, a sufficient range of on-board sensors for detecting the surroundings of a vehicle and a sufficiently large field of vision of the vehicle resulting from this is necessary for a reliable detecting of the surroundings. In particular in an urban environment, the sensor range and the field of vision of the vehicle resulting from this is restricted. By means of the method, the problem of such a restriction of the sensor visual range is in particular solved for automatedly driving vehicles of a vehicle fleet, by providing them with information about the surroundings of a vehicle transmitted to the back-end server by at least one vehicle, so that they are provided with information that lies outside their own sensor range. The vehicles are thereby not restricted by the range of their sensors. It is thereby possible for a vehicle to compile an environment model in the context of its trajectory planning due to the information retrieved from the back-end server, the environment model extending beyond the range of its sensors and to include regions in the trajectory planning that are hidden for the sensors or that lie outside their range. A long-term, as well as optimized, route planning can thereby be carried out. Furthermore, a checking of the on-board sensors, for example concerning a false detection by the sensors, is enabled with the back-end server as an external source. With the information received from the back-end server, the vehicle receives additional information, that can be used for the checking of the functionality of the on-board sensors and for identifying functionally impaired sensors.

BRIEF DESCRIPTION OF THE DRAWING FIGURES

Exemplary embodiments of the invention are illustrated in greater detail below by means of drawings.

Figure 2:
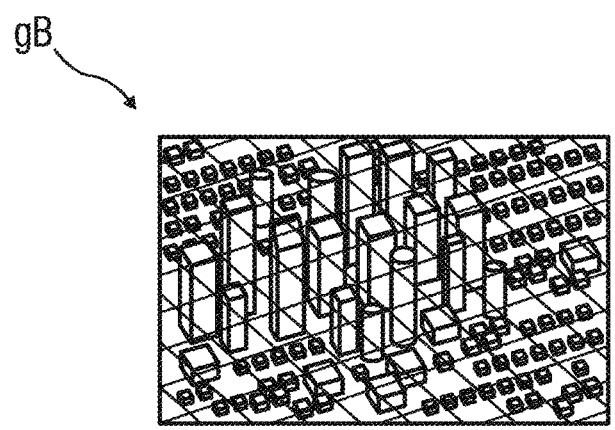
Figure 3:
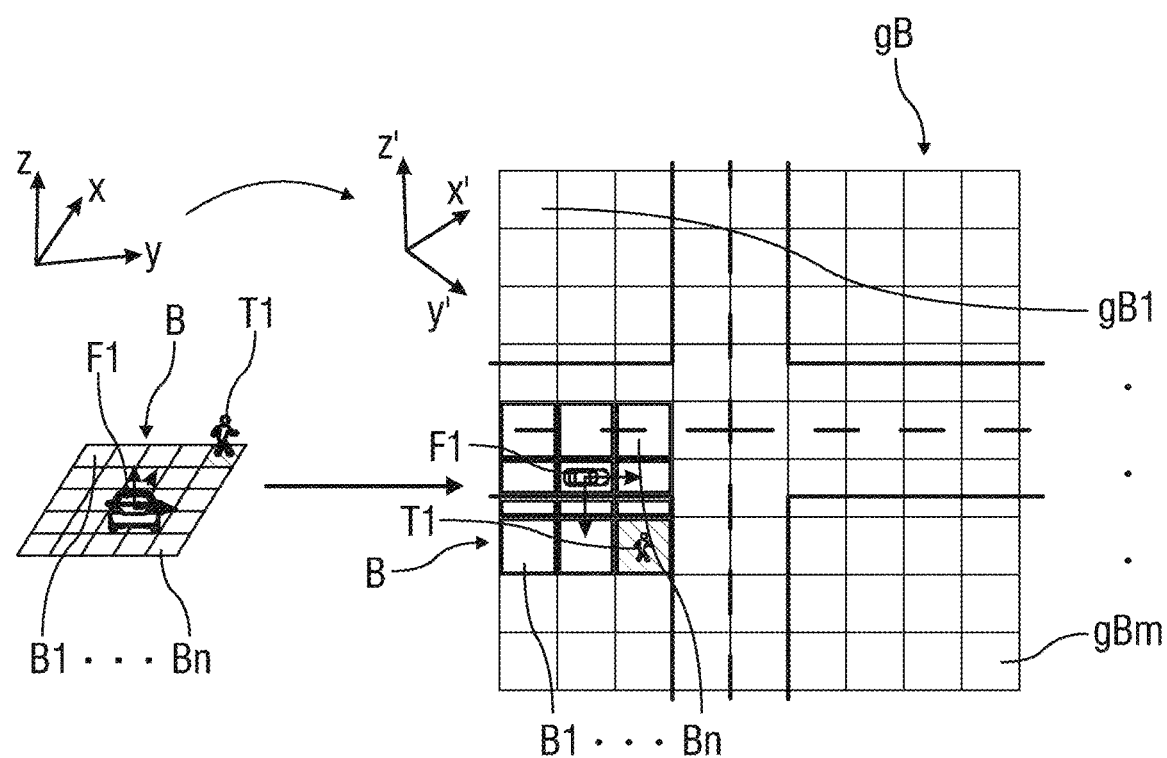
Figure 4:
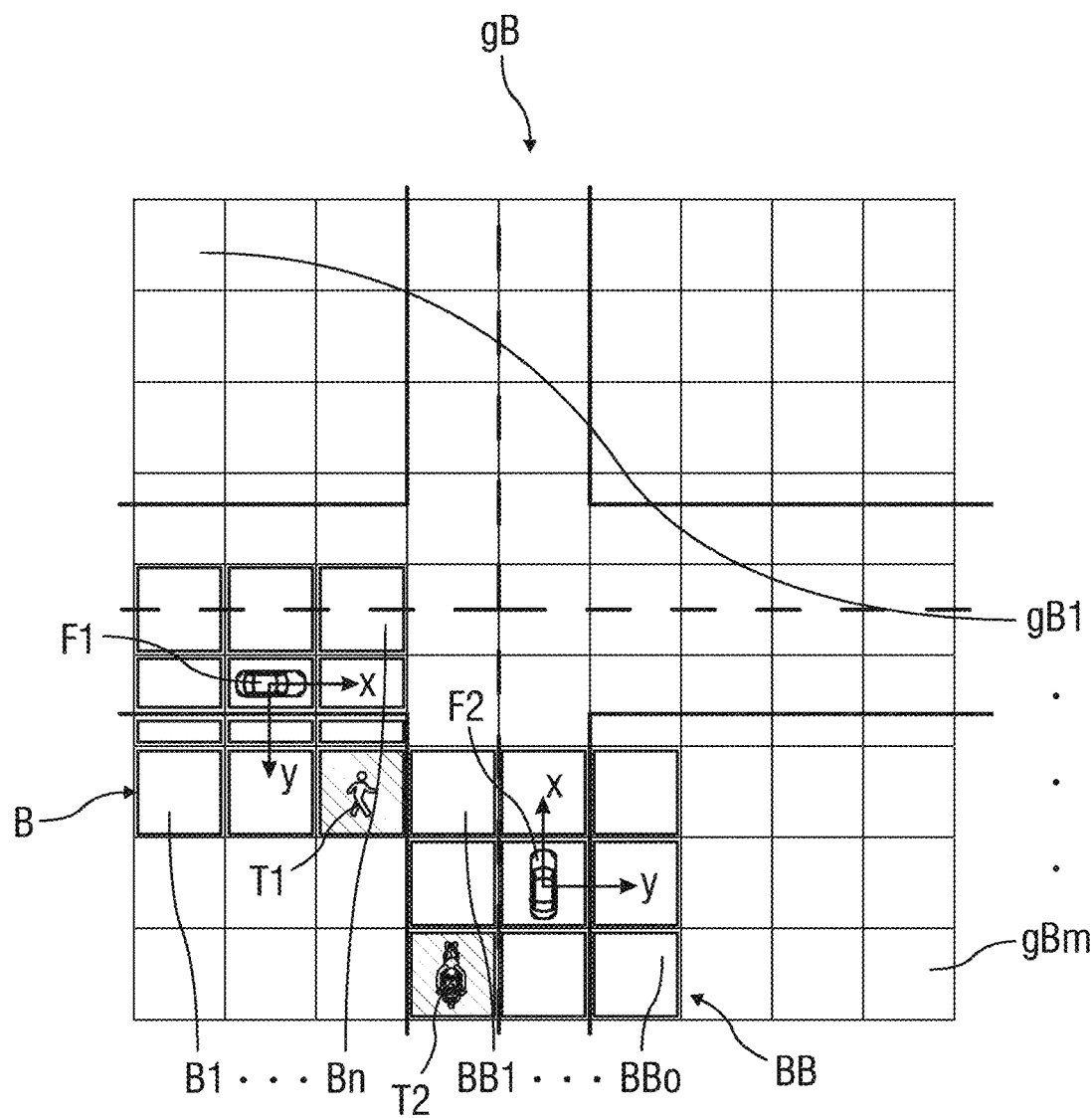
Figure 5:
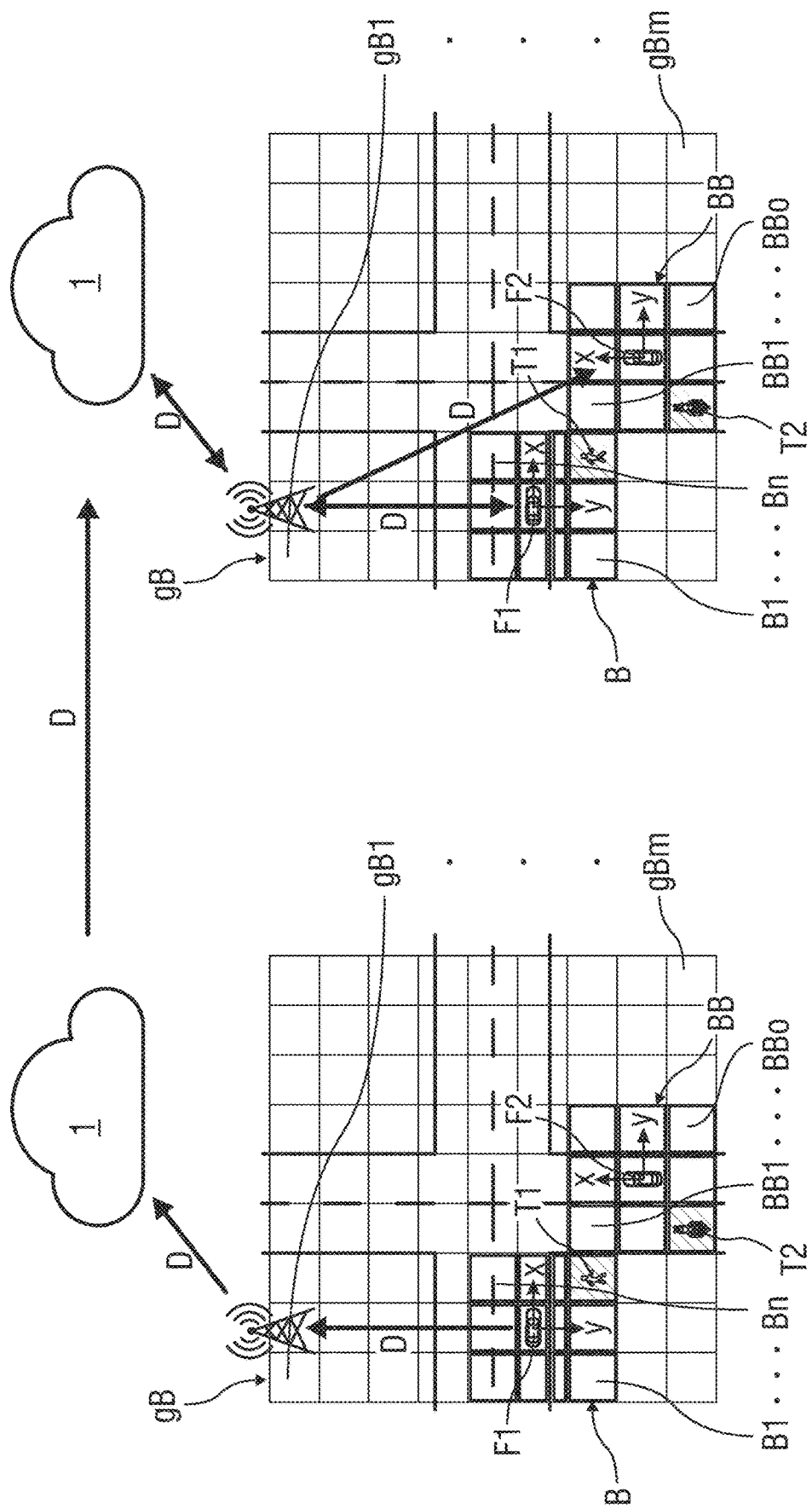

Here:

FIG. 1 schematically shows a perspective view of an occupancy grid with a vehicle and a further road user at a first point in time and a perspective view of the occupancy grid with the vehicle and the further road user at a second point in time, FIG. 2 schematically shows an occupancy grid of an urban area, FIG. 3 schematically shows a coordinate transformation of a vehicle-mounted occupancy grid and its contents in a fixed, global occupancy grid, FIG. 4 schematically shows a global, fixed occupancy grid with two vehicle-mounted occupancy grids of two vehicles that are transformed into this, and FIG. 5 schematically shows a provision of information about road users in the surroundings of a vehicle, detected by means of on-board sensors, to a back-end server, as well as a retrieval of this information from the back-end server.

Parts that correspond to one another are provided with the same reference numerals in all figures.

DETAILED DESCRIPTION

In FIG. 1, a perspective view of a vehicle F1, a vehicle-central occupancy grid B of the vehicle F1, also referred to as an occupancy grid, and a further road user T1 is represented at a first point in time t1 and a perspective view of the occupancy grid B with the vehicle F1 and the further road user T1 is represented at a second point in time t2, following on from the first point in time t1.

The road user T1 thereby moves with a speed v.

The vehicle F1 belongs, for example, to a vehicle fleet and is configured for an automated, in particular highly automated or autonomous operation. In such an automated driving operation, predicting the behavior of road users T1 represents a big challenge. In complex traffic scenarios, it is often difficult to track and to predict the behavior of all observed road users T1. A great deal of computational effort is thereby also necessary.

The occupancy grid B is presently used for predicting the behavior, wherein the vehicle F1 has a vehicle-centered coordinate system with the coordinates x, y, z. The x coordinate is thereby always orientated forwards. The other axes described with the coordinates y, z are perpendicular to this. Around the vehicle F1, a screen or grid is created, which is formed so as to be stationary around the vehicle F1 and moves with the vehicle F1 and lies in the detection region of its on-board sensors, that are not shown in more detail.

The vehicle F1 locates with its sensors all road users T1 in the surroundings of the vehicle, for example pedestrians, cyclists, passenger motor vehicles, lorries, buses, etc. and their relative distance from the vehicle F1. Stationary objects are also detected and located in addition to the road users, e.g., construction sites or other obstacles on the road. The detection can thereby be carried out by means of a plurality of sensors and/or a combination of different sensors, for example radar, lidar, camera and/or ultrasound sensors, as well as a corresponding data processing, for example of a deep learning algorithm.

A detected road user T1 is described by a data structure D, which represents a vector. The vector representing the respective road user T1 is thereby formed from information that has been detected by means of the on-board sensors. Every vector thereby comprises data as information that describes a position of the respective road user T1 relative to the vehicle F1 in the form of x, y, and z coordinates x, y, z of a cell B1 to Bn of the occupancy grid B occupied by the road user T1, wherein the z coordinate z describes a height of the respective road user T1. The vector furthermore comprises a speed vector, which represents a speed v of the respective road user T1, a time stamp, which represents a point in time t1, t2 of a detection of the respective road user T1, T2, and an object class, which represents a type of the respective road user T1. Furthermore, the vector can additionally comprise a detection reliability, which, for example, results from which sensor has detected the road user T1, and further information, for example an objective of the road user T1.

The occupancy grid B is a 2.5-dimensional grid, i.e., it is a two-dimensional screen, wherein for all road users T1, their height is, however, saved in the respective vector as a z coordinate z. The two-dimensional screen can thereby be written in a matrix, wherein every cell B1 to Bn is associated with an individual x coordinate x and an individual y coordinate y. For forming the occupancy grid B, the two-dimensional screen is overlaid and/or combined with all necessary information detected by the on-board sensors. I.e., the data structures D describing the individual road user are combined into a data field and, as indicated in FIG. 5, transmitted to a back-end server 1.

A cell B1 to Bn of the occupancy grid B can thereby be occupied or not occupied. At the point in time t1, a road user T1 formed as a pedestrian is, for example, represented with the data structure D describing them in the occupancy grid B in the cell B1. All other cells B2 to Bn are not occupied with road users T1, wherein the data structures D for the empty cells B2 to Bn are set to the value zero.

The combining of the occupancy grid B with the data structures D of the respective road user creates a representation of the surrounding environment at the point in time t1.

According to the representation, the road user T1 moves between the two points in time t1, t2 from the cell B1 to the neighboring cell B2. At least the vector that describes the position of the road user T1 relative to the vehicle F1 in the form of x, y and z coordinates x, y, z thus changes and is received in the data structure D correspondingly.

The complete occupancy grid B of the vehicle F1 can, for example, be calculated, in that the matrix with a global vector, which comprises all vectors with the respective positions of the road user T1 relative to the vehicle F1 in the form of x, y, and z coordinates x, y z, is multiplied. All non-occupied cells B1 to Bn are set to the value zero.

Information about the behavior of road users T1 is recorded during test and/or training journeys of autonomous vehicles F1. The information is thereby saved in a constant data stream from matrices. So-called deep learning models are thereby in particular used for processing the information for predicting a future behavior of road users T1. For example, an artificial neural network with a deep learning model is created, which processes the information from the test and/or training journeys. With an increasing amount of information, the model becomes more precise when predicting a behavior of road users T1 in the future for a plurality of points in time t1, t2.

The previously-mentioned concept is additionally scaled to a city-wide, global occupancy grid gB with a uniform global coordinate system. FIG. 2 shows such a global occupancy grid gB of an urban area.

In FIG. 3, a coordinate transformation of a vehicle-mounted occupancy grid B and its contents in a stationary, global occupancy grid gB, also referred to as an "operational design domain", ODD for short, is represented. In this coordinate transformation, the whole vehicle-mounted occupancy grid B of the vehicle F1 is covered with a consistent screen, which is the same for all automatedly operated vehicles F1, F2 in it, which in particular belong to a vehicle fleet. The vehicle F2 is shown in more detail in FIG. 4.

The vehicle-centered coordinate system of the automatedly driving vehicle F1 with the coordinates x, y, z and the associated occupancy grid B is transformed in a global coordinate system with the coordinates x', y', z'. It is the goal to create a uniform global occupancy grid gB with all the information detected by sensors of all automatedly driving vehicles F1, F2 operating in the global occupancy grid gB. Every automatedly driving vehicle F1, F2 shares its information detected by sensors with a back-end server 1 represented in FIG. 5. The shared information contains a data field with the data structures D describing the vehicles F1, F2. Only occupied cells gB1 to gBm of the global occupancy grid gB thereby contain information. Every non-occupied cell gB1 to gBm obtains the value zero. A data flow can thus be minimized and can be scaled to a large vehicle fleet of automatedly driving vehicles F1, F2 for the operational design domain. A low latency can thereby be achieved, which is a significant element of ensuring an operational capability.

The coordinate transformation thereby ensures that all information remains available. Only coordinate-dependent information is transformed into the respective data structures D, for example the coordinates of the cells and the speed vector. Detected road users T1 are represented both in the vehicle-centered occupancy grid B and also in the global occupancy grid gB.

As can be gathered from FIG. 4, which represents a global occupancy grid gB with two vehicle-mounted occupancy grids B, BB of two vehicles F1, F2 that are transformed into this, a separate vehicle-centered occupancy grid B, BB is respectively associated with the vehicles F1, F2. The vehicles F1, F2 can thereby detect the same road user T1, T2 or different road users in respectively different vehicle-centered cells B1 to Bn, BB1 to BBo.

By means of uploading their respective occupancy grids B, BB onto the back-end server 1 and creating a global occupancy grid gB, twice-detected road users T1, T2 occupy the same cell gB1 to gBm in the global occupancy grid gB due to the coordinate transformation. A twice-detected road user T1, T2 thereby receives a higher credibility or a larger detection reliability, since it was detected independently by two automatedly operated vehicles F1, F2.

FIG. 5 shows a provision of information about road users T1, T2 detected by means of on-board sensors in a surroundings of a vehicle to a back-end server 1, as well as a retrieval of this information from the back-end server 1.

After uploading all vehicle-centered occupancy grids B, BB for the point in time t1 onto the back-end server 1, the global occupancy grid gB is calculated based on the coordinate transformations including all road users T1, T2.

The global occupancy grid gB is then downloaded onto all vehicles F1, F2 for an artificial time stamp t1*. Every vehicle F1, F2 thereby receives information about all dynamic objects in the global occupancy grid gB. Static objects, e.g., obstacles on the road or construction sites, can be taken into consideration in the same way.

With such additional information, every individual vehicle F1, F2 can check its own detected information and, for example, plan ahead that trajectories of road users T1, T2 intersect, as well as extend its environment model across its sensor range.

The global occupancy grid gB thereby only scales with a sufficient amount of vehicles F1, F2 in the operational design domain. The global occupancy grid gB only contains information that has been detected by a vehicle F1, F2. Cells gB1 to gBm without vehicle-centered update are marked in such a way that these are described as non-detected cells gB1 to gBm for a certain point in time t1, t2.

The sensor information of the respective vehicle F1, F2 thereby contains all dynamic objects, in particular road users T1, T2, that are consolidated in the global vector, which comprises all vectors with the respective positions of the road users T1, T2 relative to the corresponding vehicle F1, F2 in the form of x, y and z coordinates x, y, Z.

Along with the information about the dynamic objects, additional data for a safe operation of the vehicle fleet is also of interest, which is classified in a first category. Additionally, non-critical information about the infrastructure and traffic is of interest, which is classified in a second category.

The safety-critical information of the first category includes, for example, data like a road sign status that is recognized by the vehicle fleet, unusual stationary objects like double-parked vehicles, crashed vehicles, lost cargo and similar objects. In particular in modern towns, non-critical information is also of extended interest. Information like occupied parking spaces, potholes and all information about predictive infrastructure and town optimization belongs to this second category.

In order to also be able to make the previously mentioned safety-critical and non-critical information available, the vehicles F1, F2 of the vehicle fleet collect real-time information via a global information network. The information saved in the occupancy grids B, BB, gB can be enhanced by means of requested data, such as, for example, about free parking spaces, collected in the back-end server 1 and shared in suitable channels, for example parking apps.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method, comprising:
detecting, by on-board sensors of a plurality of vehicles, information about a road users in surroundings of the plurality of vehicle;
generating, by each of the plurality of vehicles based on respective detected information, a vehicle-centered occupancy grid comprising a set of cells centered on a respective one of the plurality of vehicles, wherein cell each cell of the vehicle-centered occupancy grid is occupied or is unoccupied, wherein occupied cells include a vector for one of the road users detected in the respective occupied cell, wherein the vector comprises position of the one of the detected road users relative to the respective one of the plurality of vehicles;
a speed vector of a speed of the one of the road users detected in the respective occupied cell,
a time stamp of when a respective on-board sensor of a respective one of the plurality of vehicles detected the one of the road users detected in the respective occupied cell,
an orientation of the one of the road users detected in the respective occupied cell, and
an object class of a type of the one of the road users detected in the respective occupied cell;
transmitting, by the plurality of vehicle, a respective vehicle-centered occupancy grid to a back-end server;
converting, by the back-end server, each of the respective vehicle-centered occupancy grids into a global occupancy grid defined by a global coordinate system;
transmitting, by the back-end server to an autonomous vehicle that is one of the plurality of vehicles, the global occupancy grid;
converting, by the autonomous vehicle, the global occupancy grid into an occupancy grid centered on the autonomous vehicle, wherein the occupancy grid centered on the autonomous vehicle includes
cell beyond a range of at least one sensor of the autonomous vehicle; or
cells that are not in a field of vision of the autonomous vehicle;
generating, by the autonomous vehicle based on the occupancy grid centered on the autonomous vehicle, a safe driving path; and
autonomously guiding the autonomous vehicle along the safe driving path.

2. The method of claim 1, further comprising:
generating, by the autonomous vehicle, a route; and
autonomously guiding the autonomous vehicle along the route.

3. The method of claim 1, further comprising:
comparing, by the autonomous vehicle, a sensor reading corresponding to a road user detected by the autonomous vehicle with a vector at a corresponding cell in the occupancy grid centered on the autonomous vehicle; and
determining, by the autonomous vehicle based on the comparison, that a sensor that generated the sensor reading is functionally impaired.

4. The method of claim 1, further comprising:
predicting, by the autonomous vehicle using the vector, behavior of the one of the detected road users.

5. The method of claim 1, wherein position of the one of the detected road users relative to the respective one of the plurality of vehicles is a three-dimensional position.

6. The method of claim 1, wherein road users in surroundings of the plurality of vehicles include other vehicles and pedestrians.

7. The method of claim 1, wherein on-board sensors of the plurality of vehicles include at least one radar, lidar, camera, and ultrasound sensor.

8. The method of claim 1, wherein the vector further comprises a detection reliability of the detection of the one of the detected road users.

9. The method of claim 1, wherein unoccupied cells are set to a value of zero.

10. The method of claim 1, wherein each of the plurality of vehicles tracks the detected road users over time and generate new vectors for the detected road users over time.

11. The method of claim 1, wherein the global occupancy grid is a city-wide occupancy grid.

12. The method of claim 1, wherein the occupancy grid centered on the autonomous vehicle is enhanced with safety-critical information.

13. The method of claim 12, wherein the safety-critical information includes road signs recognized by one of the plurality of vehicles or unusual stationary objects, wherein the unusual stationary objects are one of a double-parked vehicle, a crashed vehicle, and lost cargo.

14. The method of claim 12, wherein the occupancy grid centered on the autonomous vehicle is enhanced with non-critical information.

15. The method claim 14, wherein the non-critical information includes one of information about occupied parking spaces and potholes.

* * * * *